United States Patent [19]

Ikedo et al.

[11] Patent Number: 4,641,298
[45] Date of Patent: Feb. 3, 1987

[54] AUTO LOADING DISC PLAYER

[75] Inventors: Yuji Ikedo; Takahiro Okajima, both of Saitama, Japan

[73] Assignee: Pioneer Electronic Corporation, Tokyo, Japan

[21] Appl. No.: 577,402

[22] Filed: Feb. 6, 1984

[30] Foreign Application Priority Data

Feb. 2, 1958 [JP] Japan .................................. 58-18551

[51] Int. Cl.$^4$ .................... G11B 25/04; G11B 1/00; G11B 3/60; G11B 17/02
[52] U.S. Cl. ............................................. 369/77.1
[58] Field of Search ................... 369/77.1, 77.2, 75.1

[56] References Cited

U.S. PATENT DOCUMENTS

| | | | |
|---|---|---|---|
| 4,434,480 | 2/1984 | Fukumitsu | 369/77.2 |
| 4,455,637 | 6/1984 | Suzuki et al. | 369/77.1 |
| 4,498,162 | 2/1985 | Schatteman | 369/77.1 |
| 4,539,670 | 9/1985 | Inaba et al. | 369/77.1 |

Primary Examiner—Steven L. Stephan
Attorney, Agent, or Firm—Sughrue, Mion, Zinn, Macpeak and Seas

[57] ABSTRACT

An auto loading disc player including a housing having a slot to receive a disc therein, a player mechanism disposed in the housing, and a disc carrier mechanism for conveying the disc close to a playing position. A pair of guides is disposed bilaterally of a carrier path for the disc for guiding the disc along the carrier path. A disc diameter discriminator mechanism engages with the periphery of the disc to discriminate between diameters of discs at the same time that the guide means guides the disc. The disc diameter discriminator mechanism includes a structure for driving the guides in such a manner that the distance between said guides corresponds to the outer diameter of the disc. The guides engage with the periphery of the disc during its conveyance to thus cause the disc to cooperate with the disc carrier mechanism for guiding the disc. The disc carrier mechanism releases the disc from engagement with the guides during the period of time when the disc is being played.

2 Claims, 33 Drawing Figures

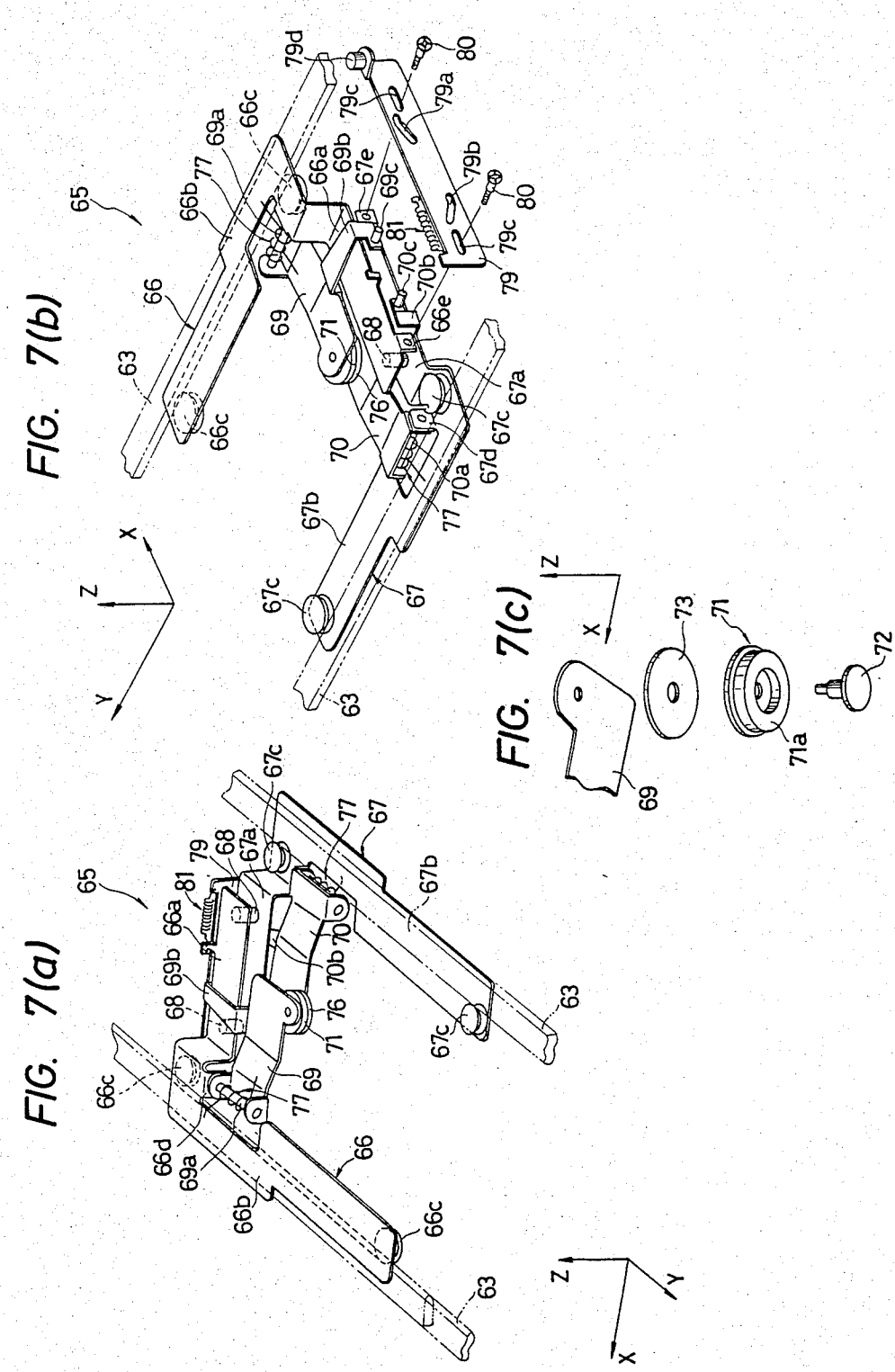

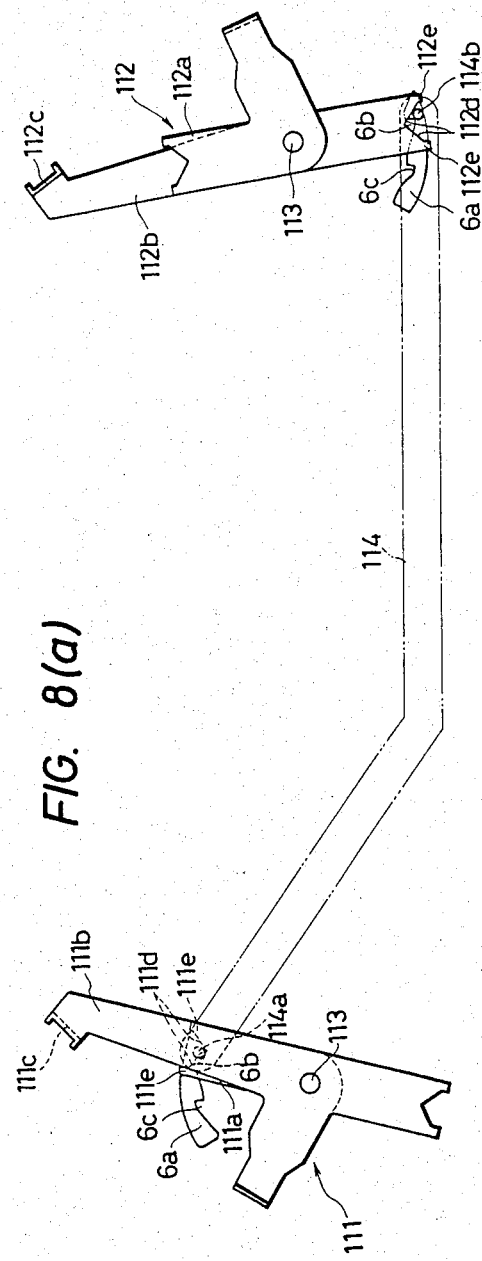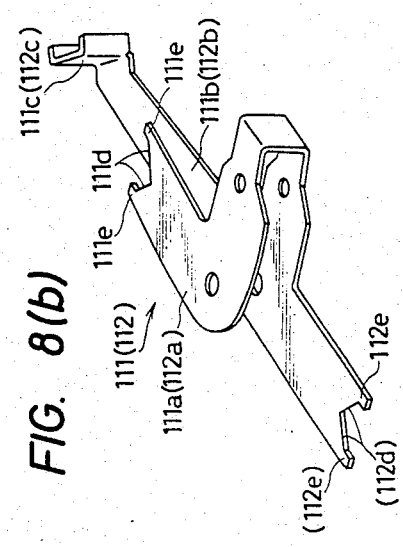

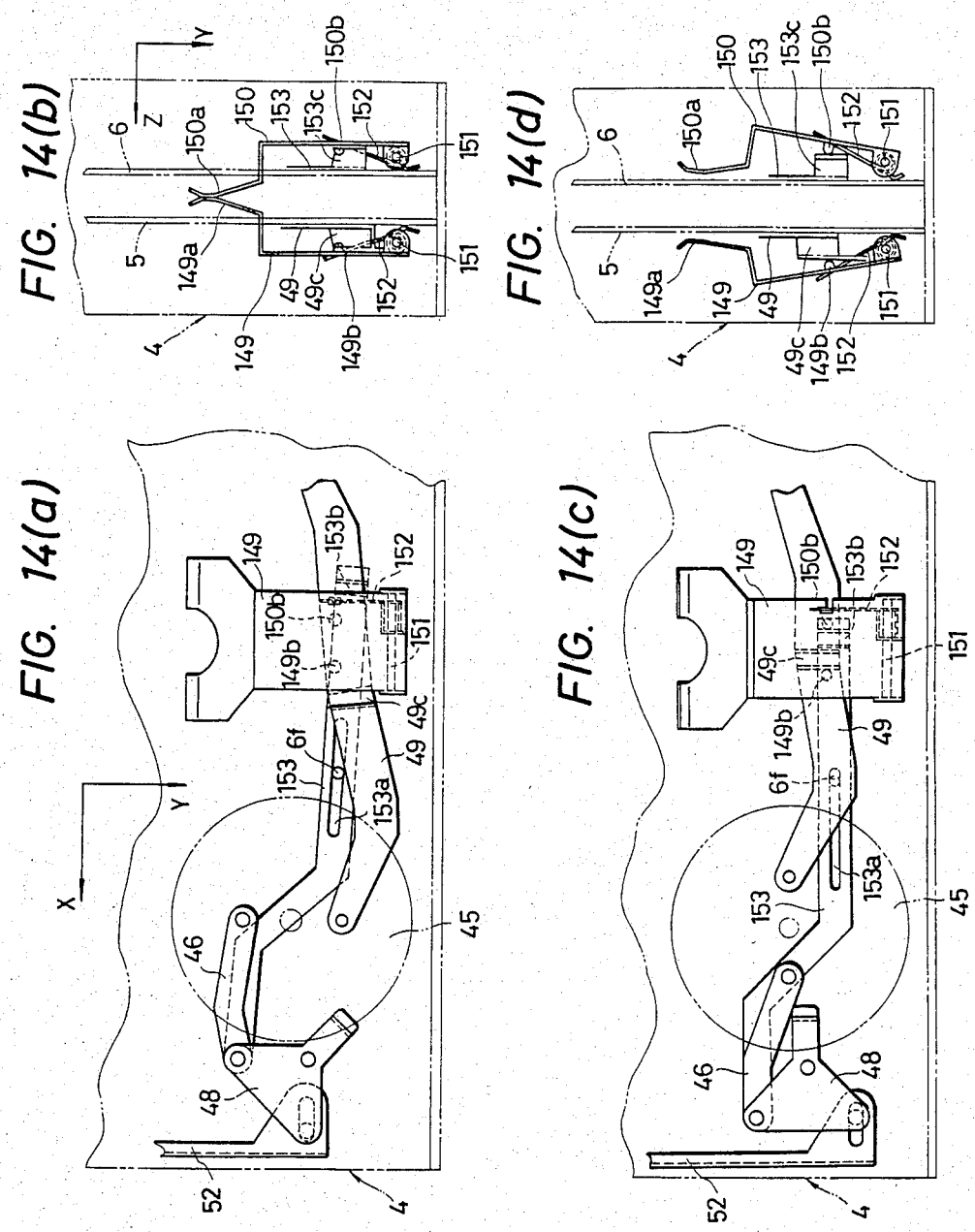

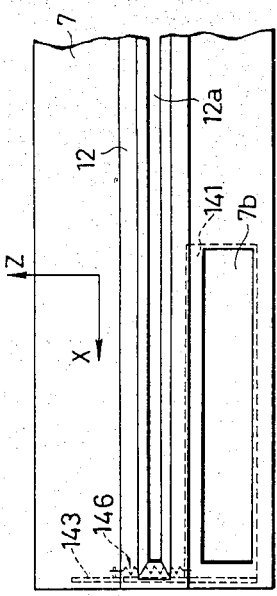
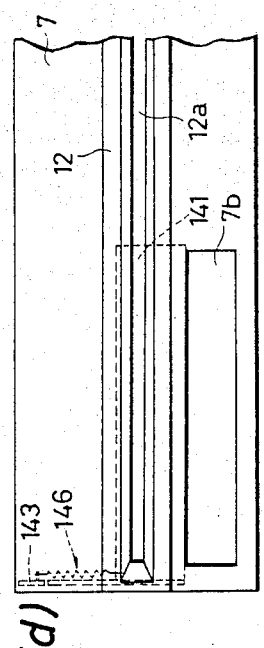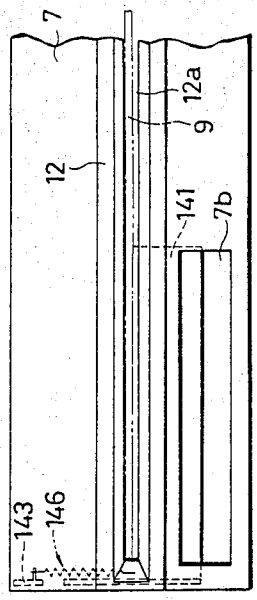
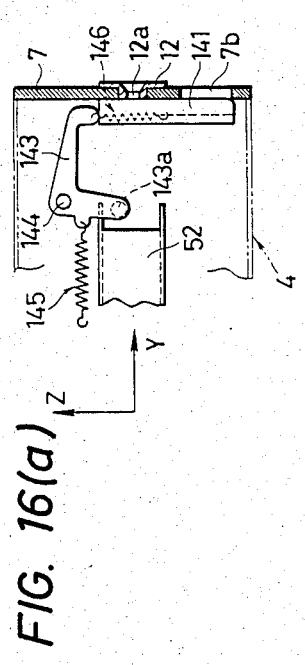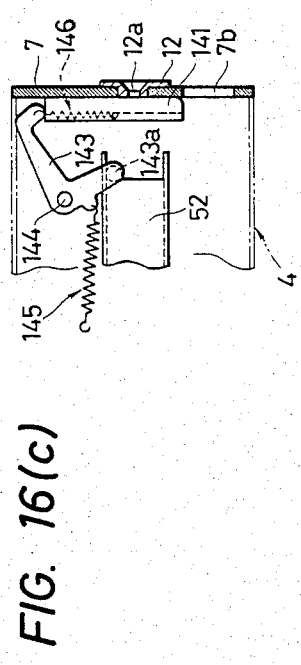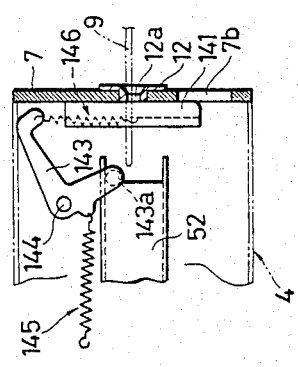
FIG. 16(a)  FIG. 16(b)
FIG. 16(c)  FIG. 16(d)
FIG. 16(e)  FIG. 16(f)

AUTO LOADING DISC PLAYER

BACKGROUND OF THE INVENTION

The present invention relates to an automatic loading disc player having a slot for disc insertion disposed in a housing.

The so-called "auto loading disc player" has a housing having a slot for inserting therein a disc, a player mechanism mounted in the housing and including a turntable and a pickup, and a disc carrier for carrying the disc inserted from the slot close to a predetermined playing position on the turntable, and is designed to automate disc playing procedures such as loading of the disc on the turntable and leading in of the pickup on the disc surface and the like. Such an auto loading disc player has employed a disc carrier having a large and complex structure.

Such players have for the most part carried and moved the disc as inserted from the slot in two directions such as, for example, one direction parallel to the turntable and another direction substantially perpendicular thereto, when the disc is moved close to a predetermined playing position. This requires a relatively greater space for carrying the disc in the two directions so that difficulty is involved in minimizing the size of the player as a whole.

The present invention is provided in view of what has been above discussed and is made with the object of providing an auto loading disc player having a reduced cost and simplified structure.

SUMMARY OF THE INVENTION

According to the invention, an auto loading disc player is provided including a housing having a slot to receive a disc therein, player means in the housing, disc carrier means for carrying the disc close to a predetermined playing position, a pair of guide means disposed bilaterally of a carrier path for the disc and for guiding the disc to carry the latter along the carrier path, and a disc diameter discriminator mechanism adapted to engage with the periphery of the disc to sense the diameter of the disc at the same time when the guide means guides the disc, the disc diameter discriminator mechanism being adapted to drive the guide means in such a manner that a distance between the guide means corresponds to the outer diameter of the disc, and the guide means being caused to engage with the periphery of the disc during its conveyance to thus cause the disc to cooperate with the disc carrier means for guiding the disc, the disc carrier means being adapted to release the disc from its engagement with the guide means during the period of time when the disc is played.

BRIEF DESCRIPTION OF THE DRAWINGS

FIGS. 7(a), (b), and (c) are perspective views of a carriage and rails,

FIGS. 8(a) and (b) are views showing a part of a disc diameter discriminating system;

FIGS. 14(a) and (c) are views used to explain the operation of guide members and associated components;

FIGS. 14(b) and (d) are right side view of the members shown in FIGS. 14(a) and (c);

FIGS. 16(a), (b), (d) and (f) are right side views of members shown in FIGS. 16(a), (c) and (e).

DESCRIPTION OF THE PREFERRED EMBODIMENTS

An auto loading disc player embodying the present invention will be described hereinafter with reference to the accompanying drawings.

Figure 1:
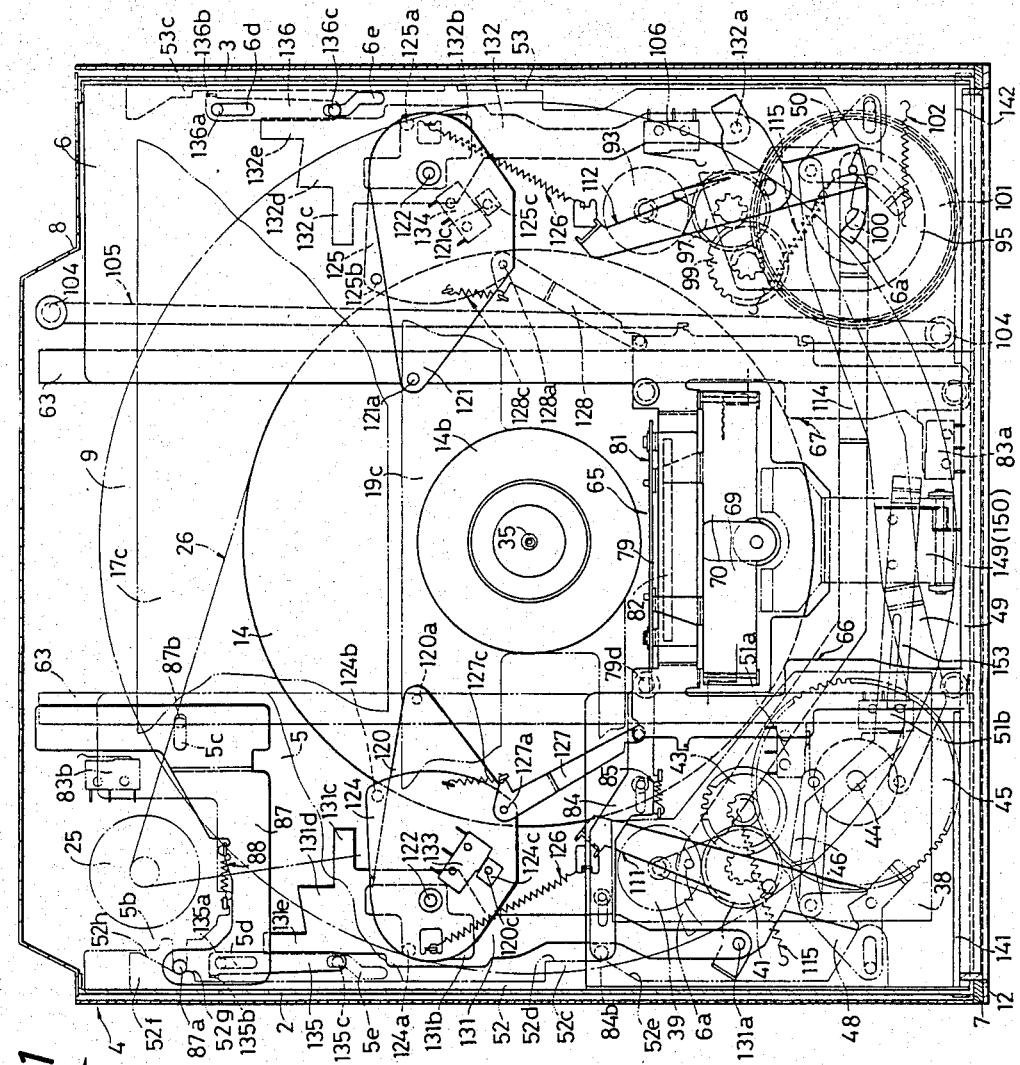
FIG. 1 is a plan view of an inner structure of an auto loading disc player embodying the invention.

In the drawings, reference numeral 1 designates an auto loading disc player constructed according to the invention. Numerals 2 and 3 are vertical chassis arranged perpendicular to a turntable, as will be described later, and are oppositely secured by machine screws to a housing 4 of the player 1 on right and left sides thereof (right and left sides referred to herein being sides toward the front indicated in the direction of an arrow Y, these sides being shown in the direction of an arrow X and the opposite direction). A pair of L-shaped lateral chassis 5 and 6 parallel to the turntables, as will be described later, are oppositely arranged between the vertical chassis 2 and 3 and include opposite ends secured by screws or spot welding to the vertical chassis 2 and 3. A front panel 7 which defines the front of the housing 4 is formed of, for example, a light alloy, whereas a rear panel 8, which also defines the rear of the housing, is made of steel plate being a plastic covering. The front panel 7 is provided with a longitudinal opening 7a. A slotted member 12 of synthetic resin or the like is mounted in the longitudinal opening 7a and provided with a substantially rectangular slot 12a to receive in the housing 4 a disc 9 to be played. A pair of turntables 13, 14 are oppositely arranged in up and down directions (the direction of an arrow Z and the direction opposite thereto) to clamp therebetween the disc 9 when the latter is played. The turntables 13, 14 are swingably supported by one of a pair of upper and lower support mechanisms 15, 16 as shown in FIGS. 1 and 6 (FIG. 5 shows only the right portions of the support mechanisms 15, 16).

The upper and lower support mechanisms 15, 16 each include one of a pair of upper and lower angle members 17, 18, and one of a pair of upper and lower turntable plates 19, 20. The angle members 17, 18 include at right and left ends thereof bent portions 17a, 18b. The rear ends of the bent portions are supported by shafts 17a, 17b in the inner surfaces of the vertical chassis 2, 3 disposed on the right and left sides and are thus pivotally mounted by the vertical chassis 2, 3. The turntable plates 19, 20 have at right and left ends thereof bent portions 19a, 20a over which the bent portions 17a, 18a of the angle members 17, 18 are mounted. The turntable plates 19, 20 are pivotally and axially supported at the respective bent portions 19a, 20a by shafts 19b, 20b in the vicinities of the pivot ends of the angle members 17, 18, that is, in the vicinity of the forward ends of the bent portions 17a, 18a.

Figure 5:
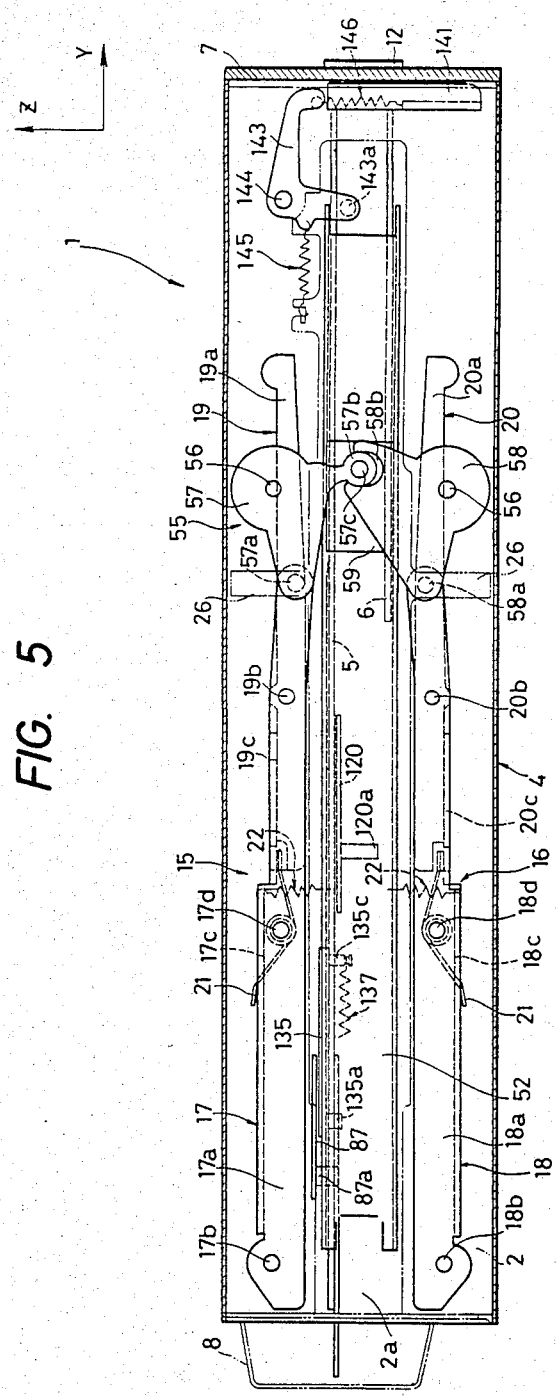
Figure 6:
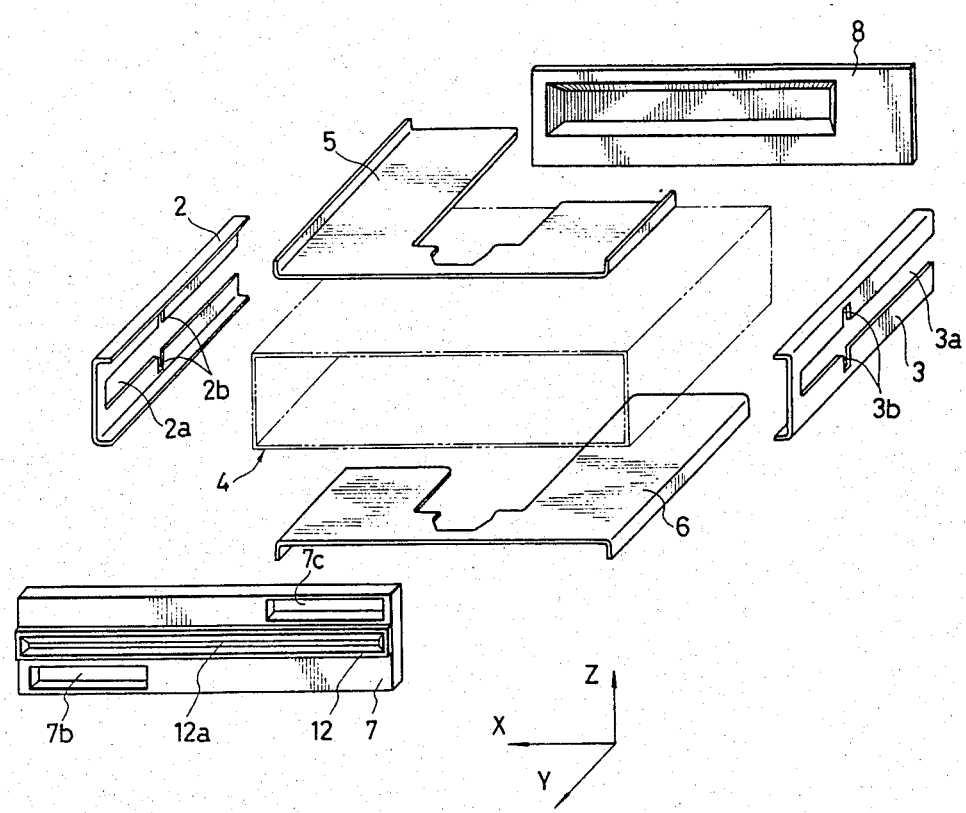
FIG. 6 is a perspective view showing an arrangement of a housing and chassis.

As is specifically apparent from FIG. 5, the upper and lower angle members 17, 18 are provided at opposite surfaces thereof with a pair of upper and lower click springs 21 by shafts 17d, 18d, the click springs having the reaction forces thereof received by horizontal portions 17c, 18c of the angle members. The upper and lower turntable plates 19, 20 are click engaged by the click springs 21 in directions of the rear ends of the turntable plates being separated from one another. The angle members 17, 18 and the turntable plates 19, 20 are energized by a pair of left and right coil springs 22 in directions towards each other.

The turntables 13, 14 and the support mechanisms 15, 16 form a part of player as well as a pickup device (not shown) for reading information from a recording surface of the disc 9. Although not shown, the player is provided with a device for detecting completion of performance of a disc.

The turntables 13 and 14 are selectively rotatably driven by a bolt 26 trained over a drive motor 25 disposed leftwards and rearwardly of the housing 4. The turntables 13, 14 include at opposite surfaces clamps 13a, 14a extending therefrom to clamp the disc 9 therebetween. Rubber sheets 13b, 14b in substantially ring forms are bonded to opposite surfaces of the clamps 13a, 14a.

Figure 4:
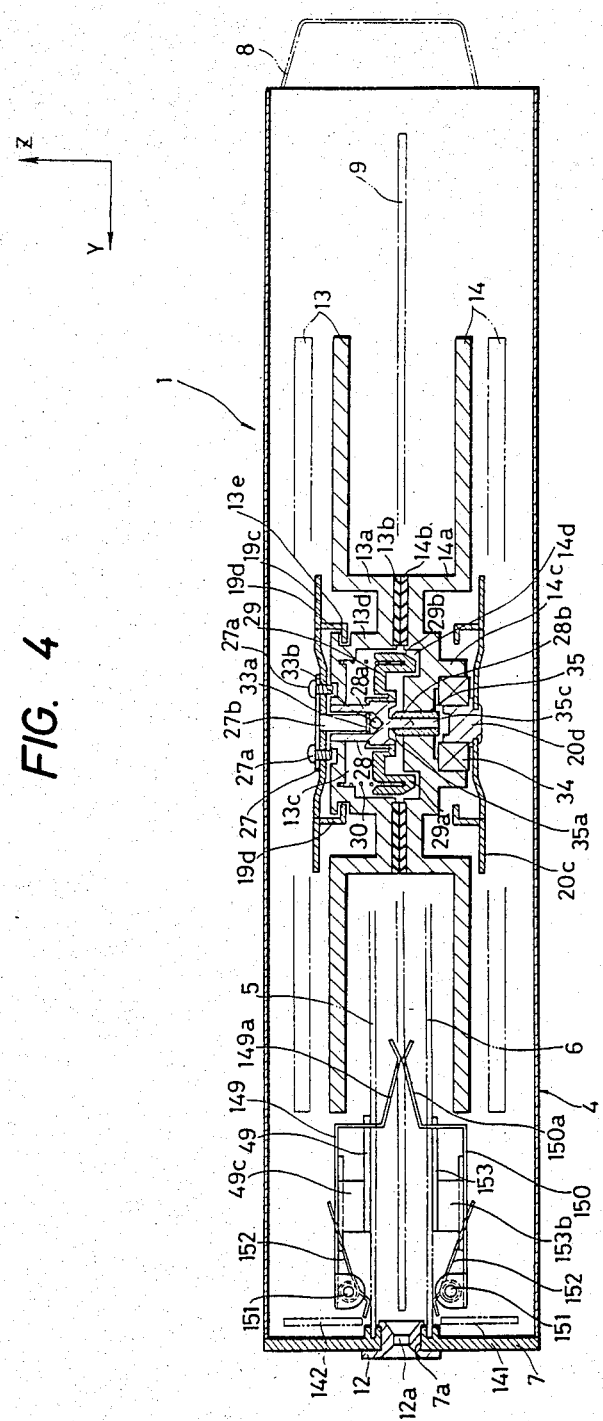

As is best shown in FIG. 4, the turntable 13 is supported by a horizontal portion 19c of the upper turntable plate 19. A laterally extending elongated reinforced member 27 is secured by a plurality of machine screws 27a to the horizontal portion 19c at its upper surface for reinforcement. An inner wall 13d is formed in the clamp 13a of the turntable 13 to define a recess 13c. A slide shaft 28 is mounted centrally of the bottom of the inner wall 13d. An EP disc adapter 29 is inserted in the recess 13c to engage with a center hole in the EP type disc 9 to position the center of the disc 9 in a predetermined playing position. The adapter 9 is mounted over the slide shaft 28 to be slidable within a limited range. A coil spring 30 trained between the bottom of the inner wall 13d and the adapter 29 serves to apply bias force to the adapter 29. A tip end 29a (referred to as an "engageable boss") of the adapter 29 is projected farther than the surface of the rubber sheet 13b. The adapter is tapered at 29a on the periphery thereof. The drive shaft 28 is provided with a upwardly open chamfer 28a in which a shaft 27b projects from the underside of the reinforced member 27. Bearing members 33a, 33b are interposed between the bottom of the chamfer 28a and the nose of the shaft 27b.

When no disc 9 is held between the turntables 13 and 14, that is, both the turntables are in open condition, the turntable 13 is supported on the horizontal portion 19c by engaging a support 19d disposed on the horizontal portion 19c of the turntable plate 19 with a surface of a ring-shaped groove 13c formed peripherally of the inner wall 13d. On the other hand, the upper and lower turntables 13, 14 hold the disc therebetween, that is, both the turntables are in a closed condition, the turntable 13 is subject to an upward reaction force and is somewhat raised, and is then rotatably supported by the shaft 27b over the bearing members 33a, 33b. The support 19d and the ring-shaped groove 13e are so formed as to release the former from engagement with the latter when both the turntables are in the closed condition.

The lower turntable 14 is supported by a horizontal portion 20c of the turntable plate 20. A recess 14c is formed on the underside of the clamp 14a of the turntable 14 to mount a bearing member 34 such as a ball bearing or the like in the recess. A shaft member 20d secured to the horizontal portion 20c is inserted in the inner peripheral surface of the bearing member 34. The turntable 14 is rotatably carried by the bearing member 34 and the shaft member 20d via the horizontal portion 20c.

An LP disc spindle 35, which is tapered at 35a on the periphery thereof, is mounted centrally of the clamp 14a to engage with the center hole in the LP type disc 9 for positioning the center of the disc in a predetermined playing position. A tip end 35b (referred to as an "engageable boss") of the spindle 35 projects farther than the surface of the rubber sheet 14b. The spindle is provided at the center of its axis with a through hole 35c in which an engageable portion 28b formed at the tip end of the slide shaft 28 is insertable. The clamp 14a is formed with a recess 14d to receive therein the engageable boss 29a of the adapter 29 when both the turntables 13, 14 are in the closed position.

Figure 2:
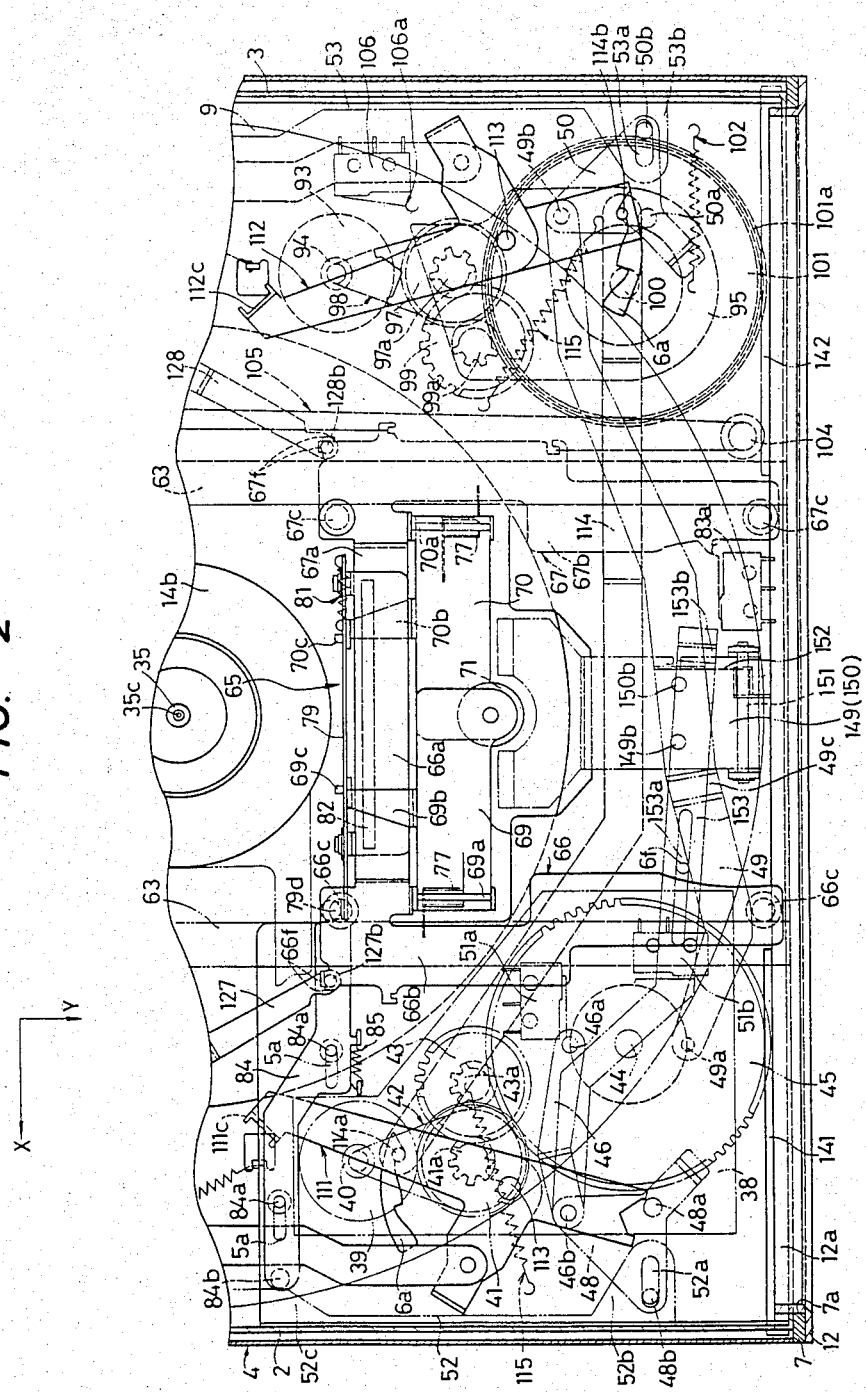
FIG. 2 is a fragmentary detailed plan view of the inner structure of the player.
Figure 3:
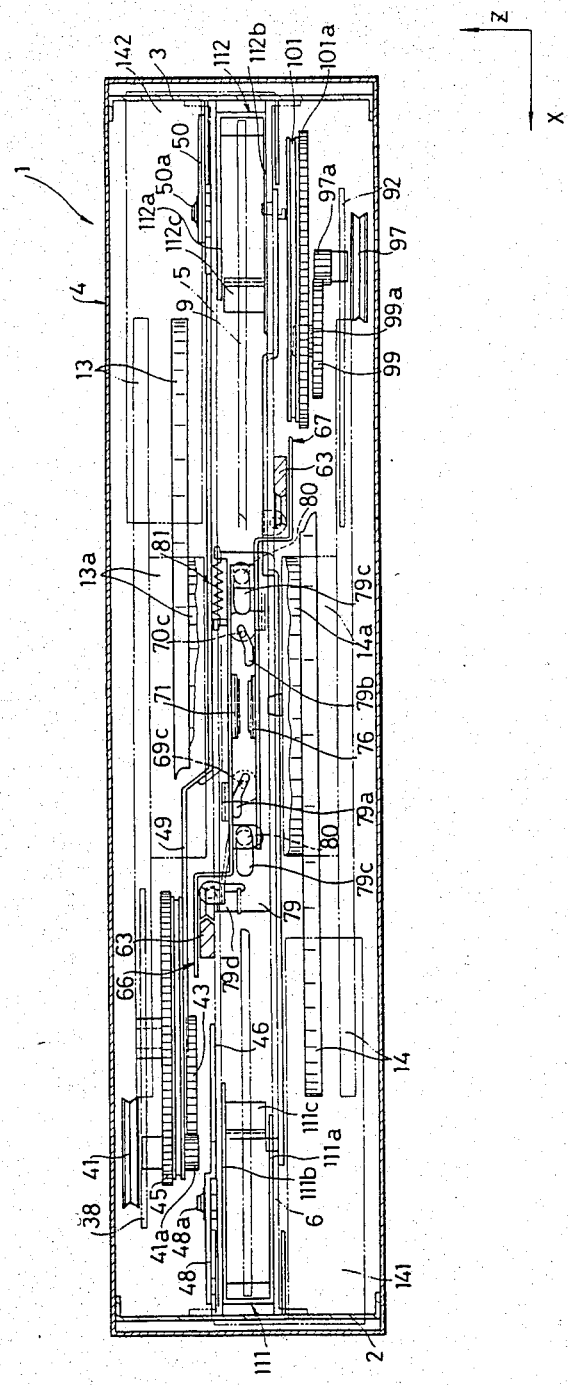
FIGS. 3, 4 and 5 are front, right side, and left side views of the player shown in FIG. 1.

As seen from FIGS. 1, 2 and 3, a carrier plate 38 is rigidly mounted by a plurality of support members (not shown) rightwardly and forwardly of the lateral chassis 5 at the surface thereof. A drive motor 39 is secured rearwardly of the carrier plate 3 on the underside thereof. The output shaft (not shown) of the drive motor 39 to which a small pulley 40 is mounted, is coupled by a pulley 41 and a belt 42 rotatably mounted on the surface of the carrier plate 38. A gear 41a is formed on the underside of the pulley 41 and meshes with a gear 43 rotatably mounted on the underside of the carrier plate 38 and leftwards of the pulley 41. A small gear 43 is secured to the gear 43 on the underside thereof and meshes with a drive gear 45 rotatably disposed by a shaft 44 on the underside of the carrier plate 38 forwardly thereof. A drive lever A46 includes one end which is pivotally attached by a shaft 46 to a predetermined position on the underside of the drive gear 45.

A drive lever A46 includes an end which is coupled by a shaft 46b to one end of a link member 48 pivotally mounted by a shaft 48a rightwardly and forwardly of the lateral chassis 5 at the surface thereof. Another drive lever B49 has one end which is pivotally mounted by the shaft 49a that is positioned symmetric to the shaft 46a with the shaft 44 as the center therebetween. The drive lever B49 is laterally extended on the lateral chassis 5 and provides an end which is connected by a shaft 49b to one end of another link member 50 pivotally mounted by a shaft 50a leftwardly and forwardly of the lateral chassis 5 at the surface thereof.

Two detector switches 51a, 51b arranged in the vicinity of the drive gear 45 are provided for detecting a rotational angle of the drive gear 45.

As is specifically evident from FIGS. 5 and 6, the vertical chassis 2 and 3 are provided with front-to-back extending slots 2a, 3a (direction of the arrow Y and direction opposite thereto), respectively. As shown in FIGS. 1, 2 and 3, slide plates 52 and 53 are inserted in the slots 2a, 3b slidably and front-to-back supported in a predetermined range by support systems (not shown) mounted on the vertical chassis 2 and 3, respectively. Mounted on the slide plates 52, 53 at the forward ends thereof are flanges 52b, 53b having slots 52a, 53a in which are inserted shafts 48b, 50b extended from the link members 48, 50 at the other ends thereof.

As shown in FIG. 5, the vertical chassis 2, 3 are provided on the exteriors thereof with a pair of left and right links 55 (FIG. 5 shows only the link on the side of the vertical chassis 2). The link 55 is implemented with a pair of swingable members 57, 58 swingably mounted by a shaft 56 on the vertical chassis 2, 3. The respective swingable ends of the swingable members 57, 58 are coupled by shafts 57a, 58a to the bent portions 19a, 20a of the upper and lower turntable plates 19, 20. It is, however, noted that the shafts 57a, 58a are arranged in positions where the upper and lower turntable plates 19, 20 are axially supported by the angle members 17 and 18, namely, at a predetermined distance ahead of positions where the shafts 19b, 20b are disposed. The swingable members 57, 58 and the bent portions 19a, 20a of the turntable plates 19, 20 are in positions so as to face each other with the vertical chassis 2 (or 3) therebetween. Thus, the vertical chassis 2 (or 3) is provided with the vertically extending slot 2b (or 3b) so as to permit the vertical chassis to swing the swingable ends of the swingable members 57, 58, that is, the shafts 57a, 58a. The slot 3b is specifically shown in FIG. 6.

The swingable members 57, 58 are provided with a convex portion 57b and a concave portion 58b engageable with one another. The convex portion 57b is formed on the interior thereof with a lock shaft 57c engageable with a front edge or an engageable concave portion 59 formed on the exterior of each of the slide plates when the latter is rearwardly and slidably moved.

The links 55 are adapted to connect the upper support mechanism 15 to the lower support mechanism 16 so as to synchronize the upper and lower turntables 13, 14 with each other in moving towards or away from each other. A link drive force application system is defined by the drive motor 39, small pulley 40, pulley 41, gear 41a, belt 42, gear 43, pinion 43a, drive gear 45, drive lever A46, link members 48, 50, drive lever B49, and the slide plates 52, 53 to exert a drive force to a part of the link 55. The link 55 and the link drive force application system form a drive system to drive the upper and lower turntables 13, 14 by means of the upper and lower support mechanisms 15, 16.

As shown in FIGS. 1, 2 and 3, the upper and lower lateral chassis 5, 6 are provided at the surfaces and on the undersides thereof with a pair of rails 63 attached by machine screws or the like. Numeral 65 designate a carriage which holds the disc 9 and which is movably supported front-to-back by the rails 63.

As is specifically clear from FIGS. 7(a) and (b), the carriage 65 includes a pair of L-members 66, 67 formed by a plastic process in the same configuration. These L-members 66, 67 include segments 66a, 67a opposite to one another in a vertical mode connected by a pair of column members 68. The L-members 66, 67 further form other segments 66b, 67b parallel to the rails 63. The other segments 66b, 67b are provided on the underside and on the surface thereof with pairs of V-grooved rollers 66c, 67c pivoted thereto. The four V-grooved rollers are rollably engaged with knife edges of the rails 63 to allow the carriage 63 to move back and forth.

The L-members 66, 67 carry upright portions 66d, 67d rearwardly of the segments 66b, 67b. The upright portions 66d, 67d are provided with a pair of clamp members 69, 70 which are disposed to hold the recording surface of the disc 9 therebetween. The clamp members 69, 70 are supported in such a manner that first ends are swingable by shafts 69a, 70a, and the other ends being opposite to one another.

As shown in FIG. 7(c), a ring member 71 of rubber or the like, which has a friction surface 71a in contact with the recording surface of the disc 9, is rotatably mounted over a collar member 73 by a pin 72 on the one end of the clamp 69 on the unserside thereof. A ring member 76, in the same configuration as the ring member 71, is attached opposite to the latter to the other clamp member 70 at the surface and the other end, similar to the clamp member 69 at the other end thereof.

A pair of coil springs 77, which are subject to reaction force by the segments 66b, 67b of the L-members 66, 67 are placed around the shafts 69a, 70b that support the clamp members 69, 70. The clamp members 69, 70 are energized by the coil springs 77 to cause the respective ends (ends to which the ring members 71, 76 are attached, namely, the disc clamp) of the clamp members 69, 70 to be close to one another, that is, to hold the recording surface of the disc 9 therebetween. A condition under which the respective ends of the clamp members 69, 70 are close to each other is referred to as the "closed condition" of the clamp members.

A plate cam member 79 with a pair of cam grooves 79a, 79b is disposed rearwardly of the carriage 65. The cam member 79 is mounted by a pair of machine screws 80 on supports 66e, 67e rearwardly of the segments 66a, 67a of the L-members 66, 67. The machine screws 80 secure the cam member 79 through a pair of slots 79c which extend left and right in the cam member 79 to the segments 66a, 67a so that the cam member 79 can reciprocate left and right in a predetermined range.

Brackets 69b, 70b are mounted on the clamp members 69, 70 to space them away from one another at a predetermined distance corresponding to the cam grooves 79a, 79b. The brackets 69b, 70b extend rearwardly of the segments 66a, 67a of the L-members 66, 67. Shafts 69c, 70c rearwardly extend from the rear ends of the brackets 69b, 70b and engage with the cam grooves 79a, 79b. The cam groove 79a formed rightwards of the cam member 79 is defined by a leftwardly and downwardly inclined portion and a horizontal continuation to the right end of the inclined portion, whereas the cam groove 79b formed leftwards of the cma member 79 is in turn defined by a rightwardly and downwardly inclined portion and a horizontal continuation to the right end of the inclined portion. The cam grooves 79b, 79a are vertically offset a predetermined amount.

The cam grooves 79a, 79b are formed in the manner as aforementioned so that the respective ends of the clamp members 69, 70, that is, the disc clamp portions, are held apart from one another by the bias forces of the coil springs 77 as the cam member 79 is leftwardly moved. In other words, the disc 9 is released from clamped engagement with the disc clamp portions.

It is noted that the cam member 79 is applied a bias force from a coil spring 81 interposed between the cam member and the segment 66a of the L-member 66.

A detector switch 82 is provided in a predetermined position rearwardly of the carriage 65 to be engageable with the periphery of the disc 9. The detector switch 82 serves to detect whether the disc is in a clamped position defined by the clamp members 69, 70.

Detector switches 83a, 83b are mounted within the housing 4 at its front and rear ends to engage with the carriage 65. These detector switches 83a, 83b are used for detecting completion of front-to-back movement of the carriage made by engagement of a part of the carriage with the switches.

The clamp members 69, 70, coil spring 77, and the cam member 79 constitute a clamp mechanism for holding the recording surface of the disc 9 therebetween.

As seen from FIGS. 1 and 2, a plate clamp lever A84 is arranged on the lateral chassis 5. The clamp lever A84 is provided on its underside with two shafts 84 extending therefrom which are slidably engaged in the pair of the left-to-right extending slots 5a formed in the lateral chassis 5. A retainer shaft 84b is rigidly mounted on the underside of the clamp lever A84 at the right end thereof and abuts against the cam 52c extending from about the center of the slide plate 52 on the right side of the retainer shaft. The cam 52c is formed with a horizontal portion 52d, front-to-back extending a predetermined distance, and a tapered portion 52e continuous with the front end of the horizontal portion 52d. When the slide plate is in a neutral position as shown in FIGS. 1, 2 and 5, the retainer shaft 84b is caused to abut against the front end of the horizontal 52d. The front-to-back length of the horizontal 52d is chosen to be greater than the distance at which the slide plate 52 is slidable from the neutral position to the front. The left end of the clamp lever A89 may be engaged with the retainer shaft 79d rightwardly of the cam member 79 laid on the carriage 65 when the carriage 65 is in the forward position.

It is noted that the clamp lever A84 is rightwardly energized by a coil spring 85 disposed forwardly of the clamp lever.

As is apparent from FIGS. 1 and 5, another clamp lever B87 is also arranged rearwardly of the lateral chassis 5 on its surface. A pair of shafts 87a, 87b disposed adjacent both side of the clamp lever B87 are slidably engaged in the recess 5b and the slot 5c in the lateral chassis 5 to cause the clamp lever B87 to move right-to-left in a predetermined range. A shaft 87a on the right side of the clamp lever B87, abuts against a cam 52f disposed rearwardly of the slide plate 52. The cam 52f is provided with a horizontal portion 52g extending parallel to the direction (right-to-left) in which the slide plate 52 extends, and a taper 52h continues to the rear end of the horizontal portion. The clamp lever B87 is positioned so that the shaft 87a on the right side abuts against the horizontal 59g when the slide plate 52 is in the neutral position. The left end portion of the clamp lever B87 has a predetermined front-to-back length, and is engageable with the retainer shaft 7 rightwardly of the cam member 79 in a predetermined movement range of the carriage 65 rearwardly of the housing 3. The clamp lever B87 is provided a rightward bias force from a coil spring 88 mounted adjacent the clamp lever B87.

Not only the link drive force application mechanism or system for applying drive force to the link 55 which is a component of drive means for driving the turntable 13, 14 and which is also a part or a member of drive system, but also the clamp levers A84, B87 provide a cam member drive force application mechanism or system to exert a drive force on the cam member 79. The clamp mechanism laid on the carriage 65 to hold the recording surface of the disc 9 and the cam member drive force application system form a gripping mechanism which is adapted to hold the recording surface of the disc 9 inserted through the slot 12a in the housing 12a, thereby gripping the disc 9.

Next, a carriage running drive device for running and driving the carriage front-to-back will be described hereinafter.

As shown in FIG. 3, rigidly mounted by a plurality of support members (not shown), leftwardly and forwardly of the lower lateral chassis 6 on its underside, is a carriage plate 92 which is of about the same configuration as the carriage plate 38 disposed rightwardly and forwardly of the lateral chassis 5 on its surface. As is evident from FIGS. 1 and 2, a drive motor 93 is secured rearwardly of the surface of the carriage plate 92. A small pulley 94 is mounted on the output shaft (not shown) of the drive motor 93. A gear base member 95 is pivotally supported on the carrier plate 92 on the underside thereof. A pulley 97 is rotatably mounted on the rear end of the gear base member 95, namely, on its pivotal end surface, is coupled by a belt 98 to the small pulley 94.

A gear 97a is formed on the pulley 97 on the surface thereof and meshes with a gear 99 rotatably supported on the surface of the bear base member 95 rightwardly of the pulley 97. A pinion 99a is formed on the gear 99 on the surface thereof, meshing with a gear section 101a preferably integrated with a pulley 101 on the underside of the latter and rotatably supported by a shaft 100 forwardly of the carrier plate 92 on its surface. To the gear base member 95 is applied counterclockwise bias force as shown in FIGS. 1 and 2 by a coil spring 102.

A pair of pulleys 104 are rotatably disposed at the front and rear ends of the underside of the lateral chassis 5. A belt 105 is trained between the both pulleys 104. The opposite ends of the belt 105 are coupled to the left end of the L-member 67 of the carriage 65. The intermediate control portion of the belt 105 is wound around a pulley 101 in a conventional manner. The left side of the rear end of the gear base member 95 is adapted to engage with a detector area 106a of a detector switch 106 disposed leftwardly of the drive motor 93 when the gear base member is clockwise pivoted in the drawing (FIGS. 1 and 2). The carriage running drive device for running and driving the carriage 65 back-and-forth is defined by the drive motor 93, small pulley 94, pulley 97, gear 97a, belt 98, gear 99, pinion 99a, pulley 101, gear 101a and the belt 105. A disc conveying system for conveying the disc 9 adjacent the predetermined playing position is defined by the aforementioned drive system, gripping mechanism, the carriage running drive device, and related components.

A detector device for detecting an increase in resistance to running of the carriage 65, that is, resistance to conveyance of the disc 9, is composed of the gear base member 95, coil spring 102 and the detector switch 106.

As is apparent from FIGS. 1, 2, 3, and 8(a) and 8(b), a pair of discriminant levers 111, 112 are arranged forwardly intermediate between the lateral chassis 5, 6 in a right-to-left symmetrical pattern with the right and left rails as the center. The right and left discriminant levers 111, 112 are preferably complementary in shape. The discriminant levers 111, 112 are swingably supported by a support shaft 113 fixed to the lateral chassis 5 (or 6) in a direction substantially perpendicular to the recording surface, that is, extended in a vertical direction. The discriminant levers 111, 112 are formed from, for instance, a rigid plastic-coated plate including substantially V-shaped segments 111a, 112a and substantially T-shaped segments 111b, 112b continuous with the V segments and opposite portions thereto.

Bent portions 111c, 112c are formed at the rear ends of the T segments 111b, 112b to engage with the periphery of the disc 9. A synchronous lever 114 is interposed between the discriminant levers 111, 112 to synchronize actuation thereof. A boss 114a, mounted on the right end of the synchronous lever 114, rides on a cam provided at the rear end of the V segments 111a of the discriminant lever 111. This cam has a taper 111d, and a projection 111e formed bilaterally of the taper. Another boss 114b extends from the left end of the synchronous lever 114 and rides on a cam formed at the front end of the T segment b of the discriminant lever 112. This cam is composed of a taper 112d, and a projection 112c formed bilaterally of the taper.

Further, a lateral chassis 6 is formed with a pair of openings 6a in which the bosses 114a, 114b at right and left opposite ends of the synchronous lever 114 are engaged. Latch claws 6b, 6c, which are adapted to latch the bosses 114a, 114b, namely, the synchronous lever 114 in the proximity of the opposite ends thereof according to the outer diameter and dimensions of the disc 9, are arranged side by side from right to left in each of the openings 6a. The latch claw 6b is dimensioned to latch the synchronous lever 114 when the disc 9 has an outer diameter of 17 cm, whereas the latch claw 6c is adapted to perform the same operations when the disc 9 has an outer diameter of 25 cm. When the disc 9 has a 30 cm outer diameter, the synchronous lever 114 is latched by engagement of the bosses 114a, 114b with the right ends of the opening 6a.

As is best seen in FIGS. 1 and 2, the synchronous lever 114 is energized by two coil springs 115 in a counterclock direction as in FIGS. 1 and 2. A pair of right and left latch mechanisms for latching the synchronous lever 114 in the proximity of the opposite ends thereof are formed by the right and left coil springs 115, latch claws 6b, 6c, and the right ends of the openings 6a. The latch mechanism on the side nearer the discriminant levers 111, 112 is released when the bent portions 111c, 112c of the discriminant levers are engaged with the disc 9.

A disc diameter discriminating mechanism is defined by the discriminant levers 111, 112, synchronous lever 114, and the latch mechanisms to engage with the periphery of the disc 9, thereby determining the diameter of the disc.

As shown in FIGS. 1 and 5, the lateral chassis 5, 6 is provided on its underside and surface with right and left guide plates 120, 121 in a pair which are similar to one another in configuration and which are disposed in an upside down position in the disc conveying patch, that is, outwardly of the opposite ends of the right and left rails 63.

The two guide plates 120, 121 extend in a direction substantially perpendicular to the recording surface of the disc, namely in a vertical direction, and are swingably supported by a support shaft 122 secured to the lateral chassis 5, 6. The pivotal ends of the guide plates are provided with retainer shafts 120a, 121a engageable with the periphery of the disc 9.

As shown in FIG. 1, a pair of right and left abutment plates 124, 125 as well as the guide plates 120, 121 are arranged to hold the lateral chassis 5, 6 therebetween, swingably supported by support shafts 122 adapted to support the guide plates 120, 121. The right and left abutment plates 124, 125 are energized by a pair of right and left coil springs 126 in counterclockwise and clockwise directions in FIG. 1. These coil springs 126 form a part of the disc diameter discriminating mechanism. Reset plates 127, 128 are pivotally mounted by shafts 127a, 128a on the abutment plates 124, 125 at each of the front end.

A pair of right and left guide members are composed of guide plates 120, 121, abutment plates 124, 125, the reset plates 127, 128, and related components.

The left and right guide members, as will be detailed hereinafter, are driven to have a distance therebetween corresponding to the outer diameter discriminated by the aforementioned disc diameter discriminating mechanism as the latter is actuated.

Guide means are employed for guiding the disc 9 in association with the disc conveying mechanism as previously referred to so as to convey the disc along the disc conveyance path. The disc 9 is guided by engaging a part of guide members (in this instance, the retainer shafts 120a, 121a of the guide plates 120, 121) when the disc 9 is conveyed by the disc conveying means to the predetermined playing position.

A disc diameter discriminating operation effected by the disc diameter discriminating mechanism may be performed simultaneously with the guiding of the disc.

The reset plates 127, 128 are provided for resetting the abutment plates 124, 125 and the guide plates 120, 121, and the pivotal ends of the reset plates include shafts 127b, 128B (FIG. 2) extending therefrom. The shafts 127b, 128b are adapted to engage with engaging portions 66f, 67f (FIG. 2) formed at the rear ends of the L-member 66, 67 of the carriage 65. The reset plates 127, 128 are biased counterclockwise and clockwise by coil springs 127c, 128c.

The abutment plates 124, 125 are formed with rectangular openings 124c, 125c in which shafts 120c, 121c projecting from the guide plates 120, 121 are loosely inserted. Detector switches 133, 134 are fixed to the abutment plates 124, 125 and along with the rear edges of the openings 124c, 125c. The detector switches 133, 134 are depressed by the two shafts 120c, 121c and then actuated when the latter are engaged by the rear edges of the openings 124c, 125c.

The detector switches 133, 134 are provided for detecting engagement of the outer periphery of the disc 9 with the aforementioned guide members and are referred to as first detector devices.

Detector devices for detecting an increase in resistance to conveyance of the disc 9 as previously referred to are provided to detect the increase in resistance of such conveyance, thus determining if the disc has completed its movement to the predetermined playing position. These devices are referred to as second detector devices, which are in addition to first detector devices.

A pair of left and right index levers 131, 132 are movably mounted front-to-back on the lateral chassis 5, 6 on the surface and underside thereof. The two index levers are included in the disc diameter discriminating mechanism. The front ends of the index levers 131, 132 are connected by shafts 131a, 132a to the discriminant levers 111, 112. The index levers 131, 132 are provided with openings 131b, 132b, parts of the rear edges of which are engageable with shafts 124a, 125b extending from the right and left ends of the abutment plates 124, 125.

Engaging portions 131c, 131d and 131e are formed rearwardly of the index lever 131 to engage with a shaft 124b formed rearwardly of the abutment plate 124 according to the diameter of the disc 9 (17 cm, 25 cm, and 30 cm), thereby positioning the abutment plate 124 in a predetermined position. Engaging portions 132c, 132d and 132e are also formed on the index lever 132 to engage with a shaft 125b extended rearwardly of the abutment plate 125, thereby locating the latter.

The lateral chassis 5, 6 are provided on the surface and underside thereof with a pair of left and right locating plates 135, 136 rearwardly of the index levers 131, 132. The two locating plates are included in the disc conveying mechanism as previously mentioned. Shafts 135a, 136a project from the rear ends of the locating plates 135, 136 and are slidably engaged in slots 5d, 6d extending front-to-back in the lateral chassis 5, 6. The locating plates 135, 136 are formed at the rear end thereof with projections 135b, 136b engageable with cams 52f, 53c at the rear ends of the slide plates 52, 53.

The locating plates 135, 136 are further formed at the front end with shafts 135c, 136c which pass through cam holes 5e, 6e formed in the lateral chassis 5, 6 and which engage with the index levers 131, 132 in the vicinity of the rear ends thereof. The cam holes 5e, 6e are dimensioned so that the front ends of the two locating plates, that is, the rear ends of the index levers 131, 132, are swingable rightwardly and leftwardly to a predetermined extent when the locating plates 135, 136 are moved from the position of FIG. 1 to the front. As seen from FIG. 5, the locating plates 135, 136 are rearwardly biased by a coil spring 137 (a coil spring exerting a bias force to the left is not shown).

Guide members are driven by a disc conveying system, as will be described later, which includes the locating plates 135, 136, and are adapted to be released from engagement with the disc 9 when the latter is played. Stated specifically, the guide members are so driven by the disc conveying system as to change pivotal angle positions of the two guide members to positions in opposite directions.

As is clear from FIGS. 1 through 5, a pair of left and right doors 141, 142 are mounted on the back side of the front panel 7 to vertically slide with respect to the housing 4.

Inspection windows 7b, 7c, as shown in FIG. 6, are formed in the front panel 7 on the right and lower part and on the left and upper part to allow the operator to see inside. The doors 141, 142 are movable between the slots 12a in the slotted member 12 the front panel 7 and the two inspection windows.

As is evident from FIG. 5, the doors 141, 142 are driven by the right and left slide plates 52, 53 through a pair of substantially V-shaped right and left shutter levers 143 (only the right shutter lever is shown). The left and right shutter levers 143 are swingably mounted by a shaft 144 on the inner side of the vertical chassis 2, 3. The shutter levers 143 are provided at one end thereof with shafts 143a engageable with the front ends of the slide plates 52, 53. A coil spring 145 is interposed between the shutter levers 143 and the slide plates 53, 53 to urge the shutter 143 in the clockwise direction shown in the drawing. The other ends of the shutter levers 143 and the doors 141, 142 are connected by a coil spring 146.

As clearly shown in FIGS. 1, 2 and 4, the lateral chassis 5, 6 are provided on the surfaces and undersides thereof with a pair of upper and lower guide members 149, 150 which are pivotally mounted thereon at the front ends of the two lateral chassis. Guide portions 149a, 150a are oppositely formed at the rear ends of the guide members 149, 150 to guide the recorded surface of the disc 9. Both of the guide members 149, 150 are energized by a pair of upper and lower coil springs 152, which are placed around a shaft 151 and which subject the lateral chassis 5, 6 to reaction forces so that the guide portions 149a, 150a are close to one another. (A position where the two guide portions 149a, 150a are close to one another is referred to as a closed position for the guide members 149, 150). Projections 149b, 150b extend from the guide members 149, 150 on the underside and the surface thereof.

The drive lever 49 is provided with a cam 49c which engages with a projection 149b on the guide member 149 upon leftward movement of the drive member to thus serve for upwardly urging the guide member 149. A cam plate 153 is arranged on the underside of the lateral chassis 6, extending right-to-left. A shaft 6f projected from the lateral chassis 6 and a slot 153a formed in the cam plate 153 are slidably engaged with one another so that the cam plate is movable right-to-left. The right end of the cam plate 153 and the drive lever A46 are connected by the shaft 46b to the righthand link member 48. A cam 153b is formed at the left end of the cam plate 153 to engage with the projection 150b of the guide member 150 upon rightward movement of the cam plate to downwardly urge the guide member 150.

It is noted that each of signals emitted by actuation of the detector switches 51a, 51b, 82, 83a, 83b, 106, 133 and 134 and the performance completion detector is sent to a controller (not shown) disposed in the housing 4. The controller is provided for supplying a predetermined drive voltage to the drive motors 39, 93 in a predetermined sequence (as will be explained when later) according to each of the signals.

Next, the mode of operation of the auto loading disc player constructed as aforementioned will be described.

FIGS. 1 through 8 show the auto loading disc player before the disc is received therein, in which state the doors 141, 142 close the inspection windows 7b, 7c (the state as shown in FIGS. 16(a) and (b)), whereas the slot 12 is open. The clamp mechanism previously described used for clamping the disc 9 and the guide members 149, 150 are all in an open position, but the turntables 13, 14 are closed.

The outer periphery of the disc 9 inserted from the slot 12a is engaged with the detector switch 82 rearwardly of the carriage 65 to start the drive motor 39 clockwise as in FIGS. 1 and 2. Thus, the gear 45 is rotated clockwise by the belt 42, pulley 41, and the gear 43 and associated components. The detector switch 51a or 51b is actuated to stop the drive motor 39 and the drive gear 45 accordingly when the latter is rotated 90° in the same direction.

Figure 9:
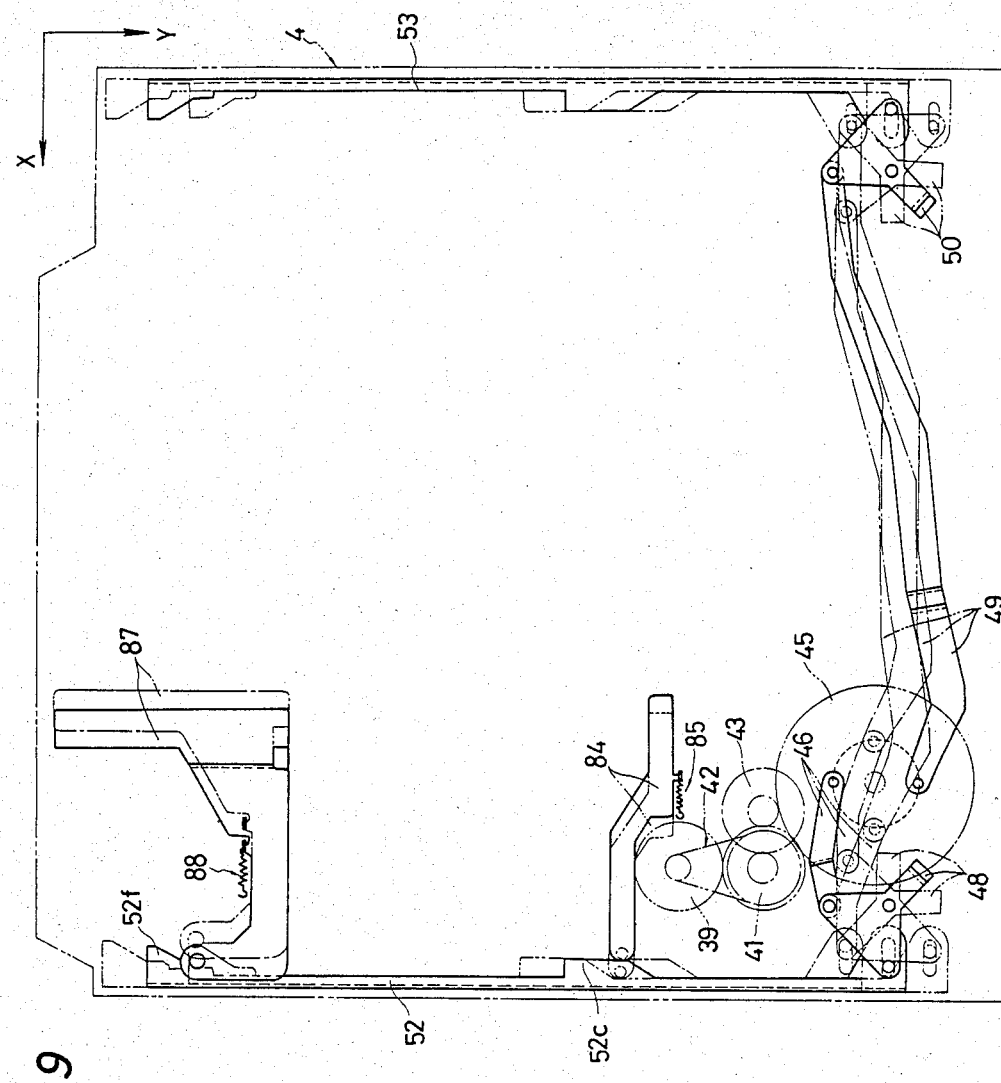
FIG. 9 is a view explanatory of actuation of a part of a disc conveying structure.

As is apparent from FIG. 9, as the drive gear is rotated clockwise 90°, the righthand and lefthand link members 48, 50 are respectively pivoted clockwise and counterclockwise about 45° by the drive levers A46, B49 and moved from the position as shown by the solid line to the position as shown by the double dot chain line. Accordingly, the bilateral slide plates 52, 53 are slid backwards and moved from the position as shown by the solid line to the position as shown by the double dot chain line. At the same time, the clamp lever A84 is rightwardly moved along the cam 52c of the slide plate 52 by the coil spring 55 and shifted from the position shown by the solid line in FIG. 9 to the position shown by the double dot and chain line. The cam member 79 of the carriage 65 is therefore free, whereupon it moves rightwardly under the force of the coil spring 81 so that the clamp members 69, 70 are closed by the coil spring 77 to hold the disc therebetween.

Figure 10A:
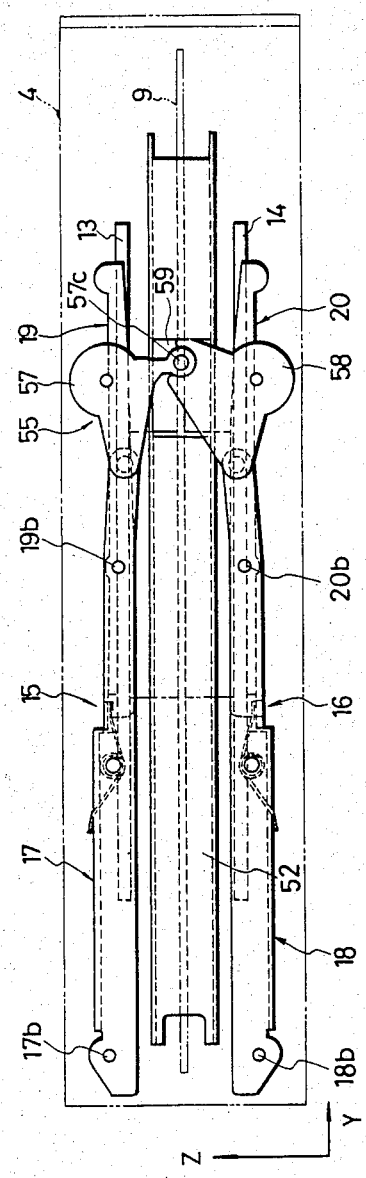
FIGS. 10(a) and (b) are explanatory diagrams depicting the operation of the turntables and the support mechanism therefor.
Figure 10B:
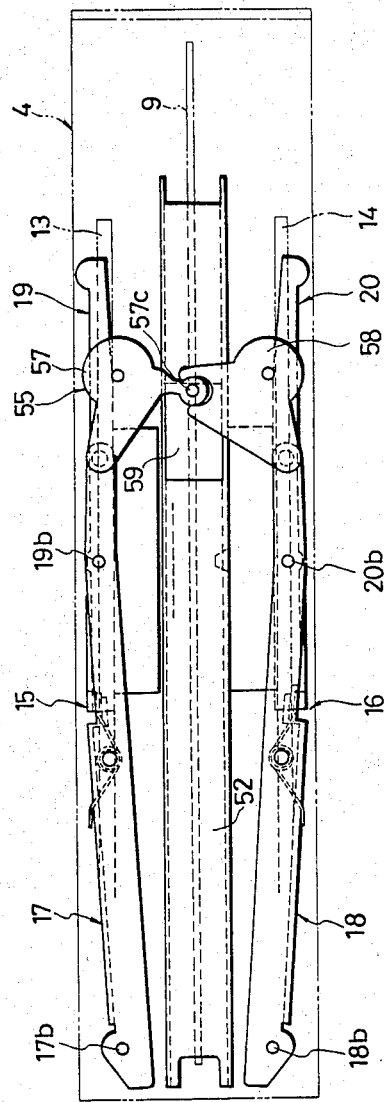

As shown in FIGS. 10(a) and 10(b), upon rearward movement of the slide plates 52, 53, the retainer shafts of the swingable members 57 (components of the links 55) are rearwardly urged by the front edges of the engageable concave portion 59 of both slide plates to actuate the links 55. Consequently, the turntables 13, 14 are driven by the upper and lower support mechanisms 15, 16 and separated from one another to assume the open position.

When clockwise rotation of the drive gear 45 through an angle of 90° is detected by the detector switch 51a or 51b, the lefthand drive motor 93 is started counterclockwise. Upon initial movement of the drive motor 93 in the same direction, the pulley 101 is driven by the belt 98, pulley 97 and the gear 99 in the clockwise direction as shown. Accordingly, the carriage 65 is driven by the 105 and shifted rearwardly.

Upon initiation of rearward movement of the carriage 65, the outer periphery of the disc 9 is engaged with at least either one of the bent portions 111c and 112c of the discriminant levers 111, 112.

Figure 11B:
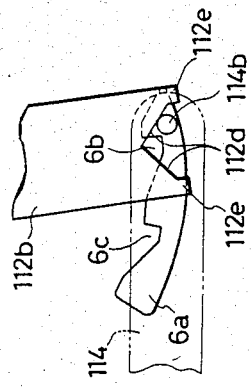
FIGS. 11(a), (b), (c) and (d) are explanatory diagrams depicting operations of a part of the disc diameter discriminating system.
Figure 11D:
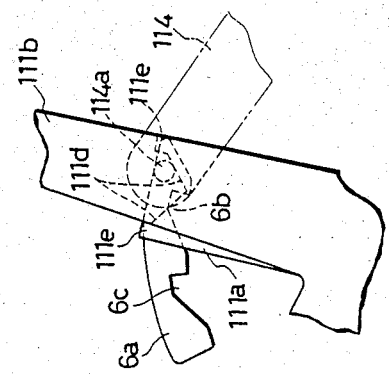
Figure 11A:
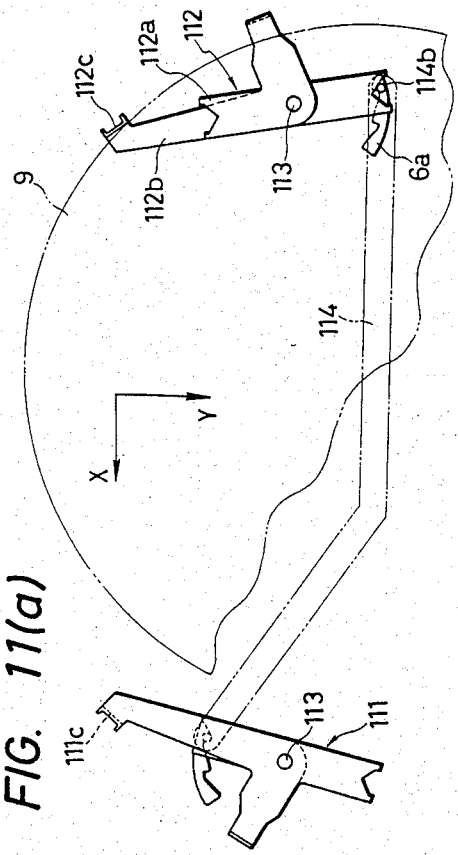

As shown from FIGS. 11(a) and 11(b), when the periphery of the disc 9 is first engaged with the bent portion 112c of the discriminant lever 112, the discriminant lever 112 is clockwise pivoted around the shaft 113 as shown to engage the taper 112d formed rearwardly of the T segment 112b with the lefthand shaft 114b of the synchronous lever 114. Since the carriage 65 still continues rearward the shaft 114b, and accordingly, the left end of the synchronous lever 114, is forwardly urged by the taper 112d. Then, the shaft 11b is released from latched engagement with the latch claw 6b of the opening 6a formed in the lateral chassis 6 to swing the discriminant lever 112 clockwise. At the same time, the lefthand projection of the projections 112c formed on the opposite sides of the taper 112d is engaged with the shaft 114b, and the synchronous lever 114 is rightwardly urged by the projection.

Also, the synchronous lever 114 is prevented from moving rightwardly since the shaft 114a at the right end of the synchronous lever is not released from latch engagement with the latched claw 6b of the other opening 6a formed rightwardly of the lateral chassis 6.

The manner in which the disc 9 is held between the clamp members 69, 70 of the carriage 65 will now be explained. The disc 9 is held in such a manner that its recorded surface end (object to be held) is held between the frictional surfaces of the ring members 71, 76 mounted on the clamp ends of the clamp members 69, 70, and the disc is pivoted around the object to be held. Thus, as the carriage 65 is further moved rearwardly, the disc 9 is pivoted rightwards around the object to be held by a reaction force derived from the shaft 12a and is guided and conveyed to the center of the disc conveyance path.

Figure 11C:
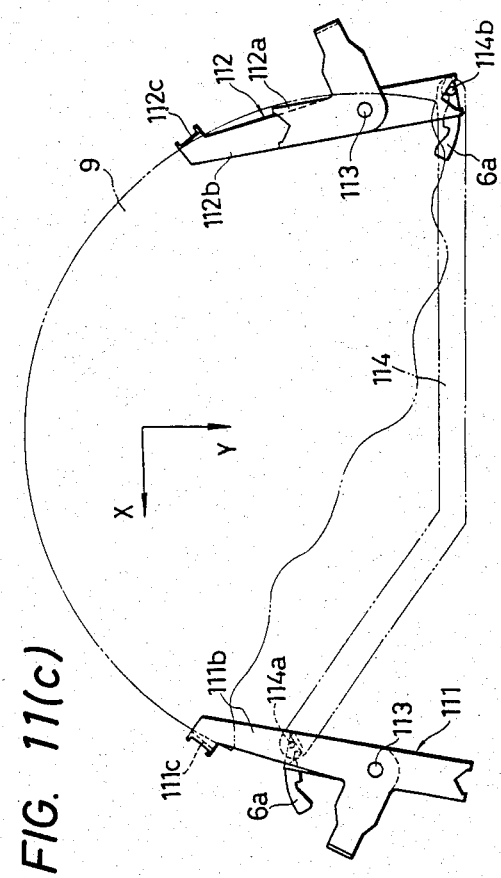

As shown in FIGS. 11(c) and 11(d), the periphery of the disc 9 is simultaneously engaged with the bent portions 111c, 112c of both discriminant levers 111, 112. When the periphery of the disc 9 is engaged with the bent portion 111c of the discriminant lever 111, the right-hand shaft 114a of the synchronous lever 114 is released from its latched engagement in substantially same manner as the disc 9 and the bent portion 112c of the discriminant lever 112. For this reason, both discriminant levers 111, 112 are swung simultaneously, through a distance determined by the outer diameter of the disc 9. Upon completion this pivotal movement, the synchronous lever 114 is again latched.

If the disc 7 has an outer diameter, for instance, of 17 cm, it can pass between the two discriminant levers (FIG. 12) without requiring any pivotal movement of the discriminant levers 111, 112. Both discriminant levers 111, 112 are thus stationary in the initial positions shown in FIG. 11(a). If the disc 9 has an outer diameter of 25 cm or 30 cm, the shafts 114a, 114b at opposite ends of the synchronous lever 114 are latched by the latch claws 6c of the left and right openings 6a and by the right ends of both openings 6a to swing the discriminant levers 111, 112 to a predetermined extent accordingly.

As aforementioned, when the discriminant levers 111, 112 are pivotally moved to a predetermined extent according to the outer diameter of the disc 9, the index levers 131, 132, whose front ends are coupled by the shafts 131a, 132a to the two discriminat levers, are moved forwardly to a predetermined extent according to the disc diameter. If the disc 9 is 25 cm in outer diameter, the discriminant lever 111 and the index lever 131 are moved from the position shown by the solid line of FIG. 12 to the position shown by the double dot chain line as shown. Similarly, the left-hand discriminant lever 112 and index lever 132 are moved in the same manner.

Meanwhile, as the carriage 65 is moved backwardly, the engageable portions 66f, 67f disposed at the rear ends of the L-members 66, 67 (components of the carriage 65) are released from engagement with the reset plates 127, 128. The abutment plates 124, 125 and the guide plates 120, 121 are then made swingable.

Figure 12:
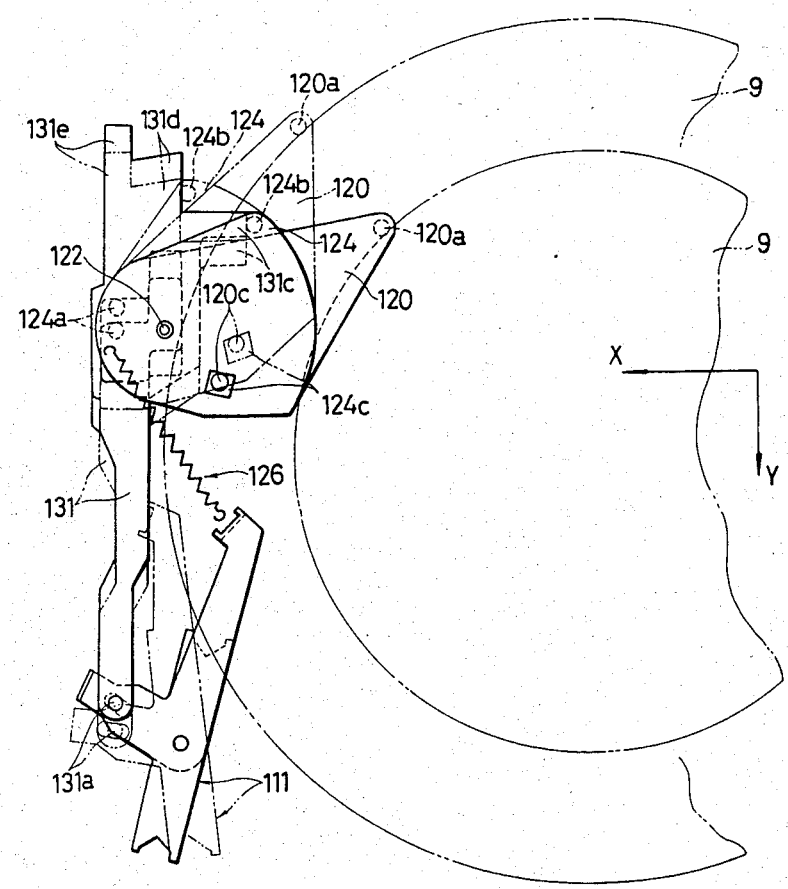
FIG. 12 is a representation of the manner in which a part of the disc diameter discriminating system is operated in association with a guide structure.

As is apparent from FIG. 12, the righthand abutment plate 124 when made swingable is pivotally moved counterclockwise by the coil spring 126 as shown. The guide plate 120 engaged by the shaft 120c with the opening 124c in the abutment plate 124 is pivotally moved in the same direction and shifted with the abutment plate 124 from the position shown by the solid line as shown to the position shown by the double dot chain line. At the same time when this movement has been completed, the shaft 124b of the abutment plate 124 is engaged with the engageable portion 131d formed rearwardly of the index lever 132 so that the abutment plate 124 and the guide plate 120 are accurately positioned according to the outer diameter of the disc 9.

The lefthand abutment plate 125 and the guide plate 121 are moved in entirely same manner and positioned according to the outer diameter of the disc 9.

It is noted that if the disc 9 has an outer diameter of 17 cm (or 30 cm), the shafts 124b, 125b of the abutment plates 124, 125 are caused to engage with the engageable portions 131c, 132c (or 131e and 132e) at the rear ends of the index levers 131, 132.

Figure 13A:
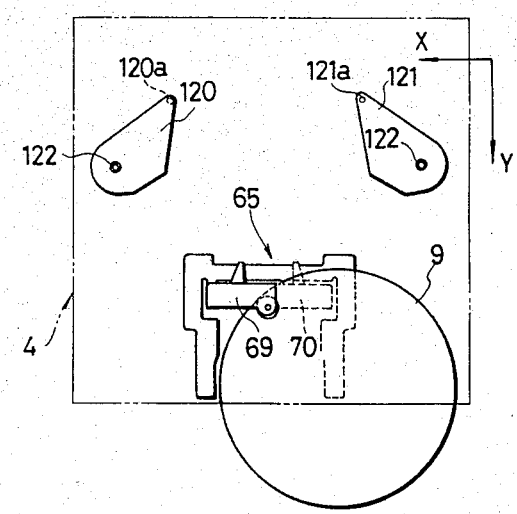
FIGS. 13(a, (b) and (c) are representations of the manner in which the disc is guided by guide structure.
Figure 13B:
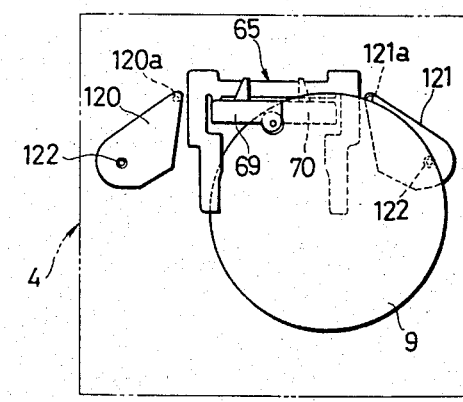
Figure 13C:
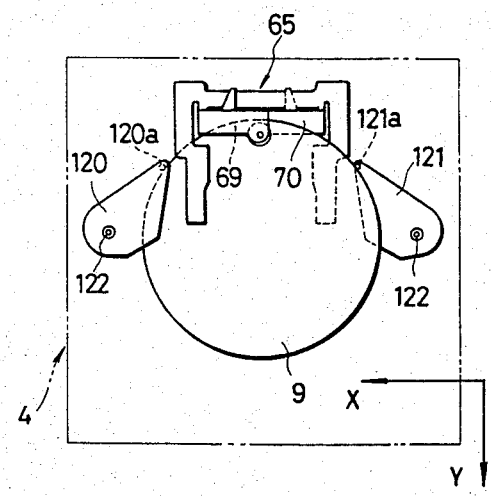

As is evident from FIGS. 13(a), 13(b), and 13(c), when the carriage 65 which carries the disc 9 is moved rearwardly a predetermined distance, the periphery of the disc 9 is engaged with at least one of the shafts 120a, 121a of the guide plates 120, 121. As above mentioned, the disc 9 is held in such a manner that the recorded surface end (object to be held) is held by the frictional surfaces of the ring members 71, 76 formed at the clamp ends of the clamp member 69, 70 of the carriage 65 and is made pivotal around the object to be held. Thus, as the carriage is further moved rearwardly, the disc 9 is rightwardly pivoted around the object to be held by reaction force derived from the shaft 121a. The disc is then guided and conveyed along the disc conveyance path.

As best shown in FIG. 13(c), the periphery of the disc 9 is simultaneously engaged with the shafts 120a, 121a of both guide plates 120, 121 to complete conveyance of the disc 9 to the vicinity of the predetermined playing position.

At the time when the periphery of the disc 9 is engaged with both shafts 120a, 121c, the detector switches 133, 134 on the abutment plates 124, 125 are operated by disc conveyance force through the shafts 120c, 121c of the guide plates 120, 121. After conveyance of the disc 9 has been completed and the carriage 65 is no longer moving rearwardly, the pulley 101 is prevented from moving further (FIG. 1 or 3). Notwithstanding, the motor 93 continues its rotation, and the gear base member 95 is pivotally moved clockwise around the shaft 100 as shown by reaction force applied by the pinion 99a of the gear 99 and the gear 101a of the pulley 101. The rear end of the gear base member 95 is therefore engaged with the detector switch 106 to operate the latter, that is, for detecting an increase in resistance to conveyance.

After actuation of all the detector switches 82, 106, 133, and 134 has been completed, the drive motor 93 is stopped simultaneously with the start of rotation of the drive motor 39 in the counterclockwise direction in FIGS. 1 and 2. Consequently, the drive gear 45 is rotated counterclockwise, as shown. When the drive gear 45 is rotated counterclockwise through 180° (more specifically, when the drive gear is rotated from the initial position through 90° in a counterclockwise direction), the detector switch 51a or 51b is again operated to stop the drive motor 39, that is, the drive gear 45 simultaneously with the start of the drive motor 93.

As clearly seen from FIG. 9, counterclockwise rotation of the drive gear 45 through 180° causes the bilateral slide plates 52, 53 to be slid forwardly, moving from the position shown by the double dot chain line to the position shown by the single dot chain line.

Counterclockwise rotation of the drive gear 45 through 90° in the first half returns the link 55 to the original and initial position again, thereby returning also the upper and lower support mechanism for supporting the turntables 13, 14 from the position shown in FIG. 2(b) to the position illustrated in FIG. 2(a). The turntables 13, 14 are then in the closed position to hold the disc 9 between the two turntables.

If the disc 9 has a diameter of 25 cm or 30 cm, the center hole in the disc is slipped on the spindle 35 of the turntable 14 so that the EP disc (diameter of 17 cm) adapter 29 disposed on the turntable 13 is depressed by the disc 9 and received in the recess 13c. If the disc 9 is an EP disc, the center hole therein is slipped on the adapter 29.

It is noted that where the disc 9 is of any of the diameters aforementioned, the rubber mats 13b, 14b of both turntables 13, 14 abut against the disc after the disc 9 has been positioned by the spindle 35 or the adapter 29 to the predetermining playing position.

As the drive gear 45 is counterclockwise rotated through 90° in the last half, the clamp lever B87 is leftwardly moved by the rear clamp 52f of the slide plate 52 against the bias force of the coil spring 88 and is shifted from the position shown by the solid line to the position shown by the single dot chain line shown in FIG. 9. Thus, the cam member 79 of the carriage 65 is leftwardly moved by the clamp lever B87 against the bias force of the coil spring 81 to place the clamp members 69, 70 in the closed position, thereby releasing the disc from clamp engagement.

As shown in FIGS. 14(a) and 14(b), as the gear 45 is rotated through 90° in the last half, the drive lever B49 and the cam plate 153 coupled to the drive gear 45 are moved leftwardly and rightwardly. Then, the cam 49c and 153b on the drive lever B49 and the cam plate 153 are engaged with the projections 149b, 150b on the upper and lower guide members 149, 150 to separate the guide 149a from the guide 150a, thereby holding both guide members in the open position.

Figure 15:
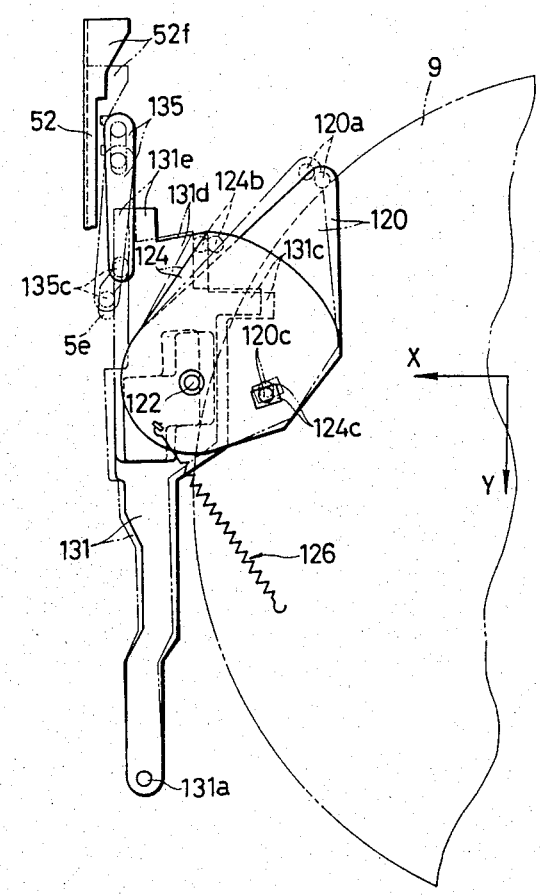
FIG. 15 is a representation showing the manner in which the periphery of the disc is engaged with a guide structure.

As seen in FIG. 15, when the slide plates 52, 53 are slidably moved forwardly with rotation of the drive gear 45 through 90° in the last half, the cams 52f, 53c rearwardly of the two slide plates are engaged with the bilateral locating plates 135, 136 which define a part of the disc conveying system. By this engagement, both locating plates are moved forwardly (FIG. 15 shows only the right side). Upon forward movement of the locating plates 135, 136, the shafts 135c, 136c at the front ends of the two locating plates are slidable in the cam holes 5e, 6b in the lateral chassis 5, 6, then serving to separate the front ends of the locating plate from one another. Accordingly, the index levers 131, 132 engaging with the shafts 135c, 136c are swingably driven to be separated from one another with the support shafts 131a, 132b as the centers. When the index lever 131 is pivotally moved in such manner and assumes the position shown by the double dot chain line from the position shown by the solid line, the shaft 124b engaged with the engageable portion 131d at the rear end of the index lever, namely, the abutment plate 124, is pivotally moved to a predetermined extent in a counterclockwise direction as shown. It is noted that the shaft 124b is engageable with the engageable portion 131b only when the disc 9 has a diameter of 25 cm.

As aforementioned, the guide plate 120 is swingably moved counterclockwise as the abutment plate 124 is also pivotally moved in the same direction as shown so that the retainer shaft 120a of the guide plate 120 is released from engagement with the periphery of the disc 9. The lefthand abutment plate 125 and the guide plate 121, though not shown in FIG. 15, are pivotally moved clockwise through a predetermined distance as shown in FIG. 1 as the index lever 132 is pivotally moved in the aforementioned manner to release the engageable portion 121a of the guide plate 121 from engagement with the periphery of the disc 9.

As above described, left and right guide devices, composed of the guide plates 120, 121 and the abutment plates 124, 125 are so moved by disc conveying means as to change swingable angle positions of both guide means to positions taken in opposite directions.

On the other hand, as is apparent from FIGS. 16(c) and 16(d), when the slide plate 52 is slidably moved forwardly, the front end of the slide plate is engaged with the retainer shafts 143a projected from one ends of the left and right shutter levers 143 to thus rotate the latter against the biasing force of the coil spring 145. Subsequently, the left and right doors 141, 142 are driven by the shutter levers 143 to open the inspection windows 7b, 7c so that both doors close the slot 12a.

When the drive gear 45 is counterclockwise rotated through 180° to operate the detector switch 51a or 51b, the drive motor 93 is again started counterclockwise (FIG. 1) as aforementioned to further move the carriage 65 backwardly. Just before the carriage 65 reaches the rear-most position, the right and rear end of the carriage is engaged with the detector switch 83b to actuate the latter, thereby stopping the drive motor 93 and the carriage 65 accordingly. At this state, disc playing is started.

When a signal indicating completion of performance is present, the drive motor 93 is rotated clockwise as in FIG. 1 to initiate forward movement of the carriage 65. When the carriage 65 is moved through a predetermined distance and reaches a position when the disc 9 is released from clamping engagement, the detector switch 82 on the carriage 65 engages with the periphery of the disc 9 and then operates to thus stop the drive motor 93 and the carriage 65 accordingly. At the same time, the drive motor 39 is rotated clockwise as shown in FIG. 1, as is the drive gear 45.

The detector switch 51a or 51b is operated at a position where the gear 45 is rotated clockwise through 180° to stop the drive motor 39 and the drive gear 45 accordingly. With termination of rotation of the drive motor 39, the drive motor 93 is again started clockwise.

As aforementioned, by clockwise rotation of the gear 45 through 180°, the bilateral slide plates 52, 53 are slidably moved rearwardly and displaced from the position shown by the single dot chain line in FIG. 9 to the position shown by the double dot chain line.

During the clockwise rotation of the gear 45 through 180°, its rotation through the last 90° moves the slide plates 52, 53 backwardly so that the locating plates 135, 136 are moved rearwardly by the biasing force of the coil spring 137 to allow the cam holes 5e, 6e in the lateral chassis 5, 6 to approach the shafts 135c, 136c at the front ends of both locating plates. The bilateral index levers 131, 132 engaged with both shafts 135c, 136c, are driven so as to approach one another. As a result, the two abutment plates 124, 125, the guide plates 120, 121, accordingly in engagement with the engageable portions 131d, 132d at the rear ends of both index levers, are pivotally moved by the coil spring 126 counterclockwise and clockwise, respectively, as shown in FIG. 1.

Accordingly, the engageable portions 120a, 121a of the guide plates 120, 121 again engage with the periphery of the disc 9.

By movement of the slide plates 52, 53 in association with clockwise rotation of the gear through the first 90°, the upper and lower guide members 149, 150 are brought into the closed position, whereas the recording surface end of the disc 9 is again held between the clamp members 69, 70 of the carriage 65. Further, the doors 141, 142 close the inspection windows 7b, 7c to open the slot 12a.

With the clockwise rotation of the gear 45 through the last 90°, the upper and lower turntables 13, 14 follow a course opposite that of the closing operation as aforementioned and are brought into the open position.

When the drive gear 45 has completed clockwise rotation through 180° to actuate the detector switch 51a or 51b, the drive motor 93 is again started clockwise (in FIG. 1) as mentioned above to maintain forward movement of the carriage 65.

During forward movement of the carriage 65, the engageable portions 66f, 67f of the rear ends of the L-members 66, 67 as components of the carriage 65 are engaged with the shafts 127b, 128b at the front ends of the reset plates 127, 128 to draw the latter forwardly. Thus, the abutment plates 124, 125 and the guide plates 120, 121 accordingly are pivotally moved against the force of the coil spring 126 and reset to the initial position as shown in FIG. 1. The bilateral index levers 131, 132, engaged by the shafts 124a, 125a with the right and left ends of the guide plates 124, 125, are rearwardly moved by the aforementioned swinging movements of both guide plates and reset. At the same time, the discriminant levers 111, 112 coupled to both index levers are also reset.

Just before the carriage 65 is returned to the front-most position, namely, the initial position as shown in FIG. 1, the left and front end of the carriage is engaged with the detector switch 83a to actuate the latter, thereby stopping the drive motor 93 and the carriage 65 accordingly. At this state, the disc 9 is extended from the slot 12a.

At the same time the driver motor 93 is stopped, the drive motor 39 is rotated counterclockwise to initiate counterclockwise rotation of the drive gear 45. The detector switches 51a, 51b are operated in a position where the drive gear 45 has rotated counterclockwise through 90° to stop the drive motor 39 and the drive gear 45 accordingly. Upon counterclockwise rotation of the gear 45 through 90°, the bilateral slide plates 52, 53 are reset to the initial position shown in FIG. 1. In this manner, the turntables 13, 14 follow the aforementioned course and are brought to the closed position. Similarly, the clamp members 69, 70 of the carriage 65 are in the open position. Thereafter, the disc 9 can be removed.

It is noted that FIGS. 16(e) and 16(f) show that the disc 9 is held between the upper end of the slot 12a and both doors 141, 142 by mistake when the doors 141, 142 (only the righthand door 141 is shown) close the slot 12 in the slotted member 12. In this manner, even if the doors are operated with the disc 9 held as above mentioned, the coil spring 46 disposed between the shutter lever 143 and both doors is expanded to provide a buffer effect so that the disc surface is prevented from being damaged by the slotted member 12.

As precisely set forth hereinbefore, the auto loading disc player according to the invention includes disc conveying means disposed on opposite sides of the disc conveyance path to carry the disc therealong, and guide means for guiding the disc in association with disc conveying means.

More specifically, the auto loading disc player according to the invention is designed so that the disc is moved by guide means in at least one direction so as to approach the predetermined playing position. For this reason, conveyance of the disc by disc conveying means required for conveying the disc from the slot to the vicinity of the predetermined playing position is performed well by a single orientation, for example, such an orientation parallel to the turntables. This renders the structure of the conveying means simple and small.

The auto loading disc player according to the invention is constructed so that guide means is driven by the disc diameter discriminating system according to the disc diameter, and that guide means is released from engagement with the disc by disc conveying means when the disc is played.

More particularly, the auto loading disc player of the invention is designed so that disc diameter discriminating system and disc conveying means are utilized as a drive source for guide means so that no specific drive source is required for driving guide means. This facilitates a reduction in the size of the player as well as its cost.

We claim:

1. In an auto loading disc player of a type including a housing having a slot to receive a disc therein, player means disposed in said housing, and drivable disc carrier means for carrying said disc close to a predetermined playing position, the improvement comprising: means defining a carrier path, a pair of drivable guide means disposed bilaterally of said carrier path for said disc for guiding said disc along said carrier path, and a disc diameter discriminator mechanism for engaging with the periphery of said disc to automatically discriminate between diameters of discs while said disc is being moved by said carrier means towards said playing position and at the same time when said guide means guides said disc, said disc diameter discriminator mechanism comprising means for driving said guide means in such a manner that a distance between said guide means corresponds to the outer diameter of said disc, said guide means engaging with the periphery of said disc during its conveyance to thus cause said disc to cooperate with said disc carrier means for guiding said disc, said disc carrier means releasing said disc from engagement with said guide means during the period of time when said disc is played.

2. The auto loading disc player as described in claim 1, further comprising a support shaft extending in a direction substantially perpendicular to a recording surface of said disc, said pair of guide means being pivotally supported by said support shaft, and said disc carrier means being so driven as to change angular positions of said guide means to be pivoted to opposite directions.

* * * * *